United States Patent [19]

Diamantoglou et al.

[11] Patent Number: 5,026,834
[45] Date of Patent: Jun. 25, 1991

[54] MODIFIED CELLULOSE FOR BIOCOMPATIBLE DIALYSIS MEMBRANES

[75] Inventors: Michael Diamantoglou, Erlenbach; Helmut Kuhne, Kreuzau, both of Fed. Rep. of Germany

[73] Assignee: Akzo N.V., Netherlands

[21] Appl. No.: 281,629

[22] Filed: Dec. 9, 1988

[30] Foreign Application Priority Data

Dec. 11, 1987 [DE] Fed. Rep. of Germany ....... 3742071

[51] Int. Cl.$^5$ .................. C08B 37/08; C08B 5/00; C08B 15/05; C08B 15/06
[52] U.S. Cl. .................. 536/20; 536/18.7; 536/30; 536/31; 536/32; 536/115; 536/117; 536/118; 536/58
[58] Field of Search .................. 536/20, 58, 18.7, 30, 536/31, 32, 115, 117, 118

[56] References Cited

U.S. PATENT DOCUMENTS

| | | | |
|---|---|---|---|
| 3,702,754 | 11/1972 | Vigo et al. | 8/120 |
| 4,278,790 | 7/1981 | McCormick | 536/84 |
| 4,872,983 | 10/1989 | Diamantoglou et al. | 536/20 |

FOREIGN PATENT DOCUMENTS

| | | |
|---|---|---|
| 1720087 | 6/1971 | Fed. Rep. of Germany . |
| 2705735 | 5/1982 | Fed. Rep. of Germany . |
| 3246417 | 6/1984 | Fed. Rep. of Germany . |
| 3312022 | 10/1984 | Fed. Rep. of Germany . |
| 3524596 | 1/1987 | Fed. Rep. of Germany . |

OTHER PUBLICATIONS

Chenoweth, "Biocompatibility of Hemodialysis Membranes", ASAIO Journal, Apr./Jun. 1984, vol. 7, pp. 44–49.

Chenoweth et al., "Anaphylatoxin Formation During Hemodialysis: Effects of Different Dialyzer Membranes", Kidney International, vol. 24 (1983), pp. 764–769.

Clingman et al., "The Alkane Dithioether and the Polysulfide Crosslinking of Cellulose", Journal of Polymer Science: Part C, No. 11, (1965), pp. 107–118.

Heuser et al., "The Rate of Esterification of Primary and Secondary Hydroxyls of Cellulose with p-Toluenesulfonyl (Tosyl) Chloride", Journal of Am. Chem. Soc., vol. 72, Feb. 1950, pp. 670–674.

Ott et al., "Cellulose and Cellulose Derivatives", Part II, p. 822.

Entwurf DIN 54 270 Blatt 2, Aug. 1974, pp. 1–4.

*Primary Examiner*—Ronald W. Griffin
*Attorney, Agent, or Firm*—Oliff & Berridge

[57] ABSTRACT

A modified cellulose has a structure represented by the formula

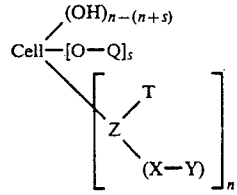

Cell is the framework of the unmodified cellulose molecule or of the chitin molecule, in each case without hydroxyl groups. Z is a nitrogen or sulfur atom. In the case where Z is a nitrogen atom, T and Z together are an acylamide or urea group and Q is (X'-Y') and/or together with the O an ester group and/or together with the O a carbamate group. In the case where Z is a sulfur atom, T is omitted and Q together with the O is an ester group and/or together with the O a carbamate group and, as desired, (X'—Y'). The relationships $0 < n < m$ and $0 \leq s < m$ are obeyed and (n+s) indicates the mean degree of substitution. $m = 3$ in the case of the unmodified cellulose molecule and $m = 2$ in the case of the chitin molecule. As desired, —X— can be omitted or —X— and —X'— denote specific divalent groups and —Y and —Y' denote —H and/or specified univalent radicals and X is identical to or different from X' and Y is identical to or different from Y'.

10 Claims, No Drawings

MODIFIED CELLULOSE FOR BIOCOMPATIBLE DIALYSIS MEMBRANES

TECHNICAL FIELD

The invention relates to cellulose derivatives which can be prepared by homogeneous reaction in dimethyl acetamide and lithium chloride.

BACKGROUND

U.S. Pat. No. 4,278,790 discloses cellulose solutions using lithium chloride and dimethyl acetamide as solvent. The solutions can contain up to 8% of lithium chloride and up to about 3% of cellulose. It is also possible to prepare cellulose derivatives in these cellulose solutions. According to this patent, the solutions are prepared by introducing cellulose into a mixture of dimethyl acetamide and lithium chloride and initially heating the mixture at about 150° C. for an extended period. Subsequently, the solution which has then formed is cooled to room temperature, while stirring.

In addition German Offenlegungsschrift 3,312,022 and German Offenlegungsschrift 3,246,417 disclose cellulose ester filaments which are insoluble in water. They have an extremely high adsorptive capacity for water and physiological fluids. This may be an advantage for some areas of use but for many it is a disadvantage.

German Patent 2,705,735 discloses a dialysis membrane for hemodialysis, having antithrombogenic compounds chemically bonded thereto, the dialysis membrane consisting of two or more layers of a cellulose regenerated from cuprammonium cellulose solution, each of which has been obtained from separately fed orifices of a spinneret, which cellulose contains chemically bonded substances having antithrombogenic activity.

However, it has also been proposed in German Offenlegungsschrift 1,720,087 that by reacting the polymeric material of the membrane with an alkyl halide and then reacting the resulting material with an alkali metal salt of an anti-thrombogenic compound having a cationic residue (for example heparin or a heparinoid compound) the risk of blood coagulation is diminished. The possible alkyl halides in this context also include haloalkyldialkylamines. Moreover cellulose, but most importantly cellulose acetate, is among the possible polymers.

An antithrombogenic effect of these known dialysis membranes is observed only when the degree of substitution of the modified cellulose is high, i.e., greater than at least 0.1, and a preheparinization with a relatively high heparin concentration (0.1 to 1% by weight solutions) is carried out in separate stage.

German Offenlegungsschrift 3,524,596 discloses a dialysis membrane with improved biocompatibility, which is distinguished in that the mean degree of substitution of a modified cellulose is 0.02 to 0.07. The known dialysis membrane composed of modified cellulose preferably contains such a modified cellulose which has a structure represented by the formula cellulose-R'-X-Y where X represents —NR"— and/or —N+R"$_2$— and/or —S— and/or —SO— and/or —SO$_2$— and/or —CO—NR—and/or —CO—O— and/or —O—, Y represents —R and/or —NR$_2$ and/or —Si(OR")$_3$ and/or —SO$_3$H and/or —COOH and/or —PO$_3$H$_2$ and/or —N+HR$_2$ and the salts thereof, R' represents an alkylene group and/or cycloalkylene group and/or arylene group having a total of 1 to 25 C atoms, R" represents a hydrogen atom or R, and R represents an alkyl group having 1 to 5 C atoms and/or a cycloalkyl group and/or aryl group.

This known dialysis membrane is capable of reducing to a considerable extent blood coagulation, leukopenia and complement activation. However, no noteworthy extent of adsorption of beta-2-microglobulin has been detected.

German Patent Application P 3,723,897.3 describes cellulose derivatives having the general formula

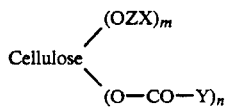

in which —Z— denotes an alkylene, alkenylene, alkynylene, cycloalkylene or benzylene or xylylene radical which may or may not be substituted, X denotes —H, —NR$_2$, —N+R$_3$, —CN, —COOH, —SO$_3$H, —PO(OR)$_2$, —CONR$_2$ or —Si(OR)$_3$, where R denotes a hydrogen atom or an alkyl or alkenyl group having 1 to 25 C atoms, or a cycloalkyl, toluyl or phenyl group, and Y is an alkyl, alkenyl or alkynyl group, which may or may not be substituted, having 1 to 36 C atoms, a cycloalkyl group or a phenyl, toluyl or benzyl group or a

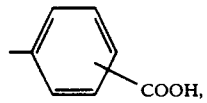

or (—CH=CH—COOH) or NH—R radical and R has the same meaning, and r=1—20,
m=0—2.5,
n=0.2 to 2.95, with the proviso that, where m=0, n≥1.55 when Y is an alkyl radical having 1—5 C atoms, a —(CH$_2$)$_r$—COOH radical with r=0, 1 or 2 or a radical of phthalic acid, and the degree of polymerization is more than 400, and which can be prepared by homogeneous reaction in a mixture of dimethyl acetamide and/or N-methylpyrrolidone with LiCl after activation of the cellulose starting material without the presence of LiCl, the preparation thereof and the use thereof for membranes and filaments.

Apart from the circumstance that dialysis membranes composed of synthetic or natural polymers can, when used in artificial kidneys, very easily induce blood coagulation, which is substantially prevented by appropriate drug treatment, in the case of dialysis membranes composed of regenerated cellulose there is frequently a transient fall in leukocytes in the first period of dialysis treatment when a kidney patient is treated with dialyzers having cellulose membranes. This effect is called leukopenia. Leukopenia is a reduction in the number of leukocytes (white blood corpuscles) in the circulating blood. The number of white blood corpuscles in humans is about 4,000 to 12,000 cells/mm$^3$.

Leukopenia associated with dialysis is most pronounced 15 to 20 minutes after the start, it being possible for the neutrophils (which are the leukocytes which can be stained with neutral or simultaneously with acidic and basic dyes) to disappear almost completely. Subsequently, the number of leukocytes recovers again within about one hour to almost the initial level or exceeds it.

If, after the leukocytes have recovered, a new dialyzer is connected, leukopenia occurs again to the same extent.

Cellulose membranes cause pronounced leukopenia. Even though the clinical significance of leukopenia has not been scientifically elucidated, there is nevertheless a desire for a dialysis membrane for hemodialysis which does not exhibit the leukopenic effect, without this adversely affecting the other very desired properties of dialysis membranes composed of regenerated cellulose.

During hemodialysis using membranes composed of regenerated cellulose, beside the leukopenia there has also been found a distinct complement activation. The complement system within the blood serum is a complex plasma-enzyme system which consists of many components and acts in various ways to prevent damage due to invading foreign cells (bacteria, etc.). When antibodies against the invading organism are present, there can be complement-specific activation by the complex of the antibodies with antigenic structures of the foreign cells, otherwise complement activation takes place by an alternative pathway due to special surface features of the foreign cells. The complement system is based on a multiplicity of plasma proteins. After activation, these proteins react specifically in a defined sequence with one another and, finally, a cell-damaging complex which destroys the foreign cell is formed.

Individual components release peptides which induce inflammatory manifestations and occasionally can also have undesired pathological consequences for the organism. It is assumed that in the case of hemodialysis membranes composed of regenerated cellulose the activation takes place by the alternative pathway. These complement activations are detected objectively by determination of the complement fragments C3a and C5a.

In this context, reference is made to the following studies: D. E. Chenoweth et al., Kidney International vol. 24, pages 746 et seq., 1983 and D. E. Chenoweth, Asaio-Journal vol. 7, pages 44 et seq., 1984.

The carpal tunnel syndrome is affected by modified cellulose derivatives. Yet, there is a considerable need for further modifications of the cellulose in order to eliminate this phenomenon too as completely as possible.

SUMMARY OF THE INVENTION

An object of the present invention was to provide modified cellulose which, in terms of leukopenia, complement activation and blood coagulation, confers optimum properties on membranes and furthermore, is able to absorb to a considerable extent the beta-2-microglobulin which is responsible for the carpal tunnel effect. This and other objects are achieved by a modified cellulose.

DETAILED DESCRIPTION OF PREFERRED EMBODIMENTS

The modified cellulose of the invention has a structure represented by the formula:

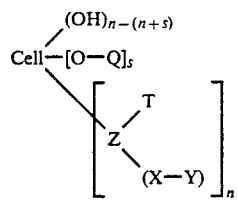

The lowermost substituent can also be referred to as $A_n$, and the group (X-Y) can also be referred to as B. In this formula, Cell is the framework of the unmodified cellulose molecule or of the chitin molecule, in each case without hydroxyl groups. Z is a nitrogen or sulfur atom. In the case where Z is a nitrogen atom, T and Z together denote an acylamide or urea group and Q denotes (X'-Y') and/or together with the O an ester group and/or together with the O a carbamate group. In the case where Z is a sulfur atom, T is omitted and Q together with the O denotes an ester group and/or together with the O a carbamate group and, as desired, (X'-Y'). The relationships $0<n<m$ and $0<s<m$ are obeyed. (n+s) indicates the mean degree of substitution. $m=3$ in the case of the unmodified cellulose molecule and $m=2$ in the case of the chitin molecule.

—X— can be omitted or —X— and —X'— denote an alkylene, alkenylene or alkynylene radical which may or may not be substituted (straight-chain and/or branched, the carbon chain also being able to be interrupted by hetero atoms such as O, S, N, P or Si as well as by CO—, CONR— or COO— groups) and/or a cycloalkylene (which may or may not contain hetero atoms and/or may or may not be substituted) and/or arylene and/or arylalkylene and/or arylalkenylene and/or arylalkynylene (which may or may not contain hetero atoms and/or may or may not be substituted) and/or bisarylalkylene and/or bisarylene radical (which may or may not be substituted) and/or radical of a condensed aromatic compound (which may or may not be substituted) and/or radical of a heterocyclic compound (which may or may not be substituted).

—Y and —Y' denote —H, and/or —NR$_2$, and/or —N$^+$R$_3$, and/or —COOH or a salt thereof, and/or —COOR, and/or —CONR$_2$, and/or —CO— R, and/or —CS—R, and/or —CSOH or a salt thereof, and/or —CSOR, and/or —CSNR$_2$, and/or —SO$_3$H or a salt thereof, and/or —SO$_3$R, and/or —SO$_2$—R, and/or —SO$_2$NR$_2$, and/or —SR, and/or —SOR, and/or —SONR$_2$, and/or —PO$_3$H$_2$ or a salt thereof, and/or —PO(OR)$_2$, and/or —PO$_2$H(NR$_2$), and/or —PO(NR$_2$)$_2$, and/or —PO$_2$H$_2$, and/or —POH(OR), and/or —CN, and/or —NO$_2$, and/or —OR, and/or halogen, and/or —Si(OR)$_3$.

R denotes a hydrogen atom and/or an alkyl, alkenyl or alkynyl group, which may or may not be substituted, having 1 to 36 C atoms (straight-chain and/or branched, the carbon chain also being able to be interrupted by hetero atoms such as O, S, N, P or Si as well as by CO—, CONR—or COO— groups) and/or a cycloalkyl (which may or may not contain hetero atoms and/or may or may not be substituted) and/or aryl and/or arylalkyl and/or arylalkenyl and/or arylalkynyl (which may or may not contain hetero atoms and/or may or may not be substituted) and/or bisarylalkyl and/or bisaryl radical (which may or may not be substituted) and/or radical of a condensed aromatic compound (which may or may not be substituted) and/or radical of a heterocyclic compound (which may or may not be substituted).

X is identical to or different from X' and Y is identical to or different from Y'. In the case where Q together with the O is an ester and/or carbamate group, Q denotes the following:

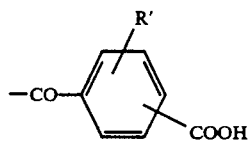

and/or —CO—(CH$_2$)$_r$—COOH and/or —CO—(C$_2$H$_3$)—COOH
                                                        |
                                                    (CH$_2$)$_r$—H and/or —CO—(C$_2$R'$_4$)—COOH and/or —CO—CR'=CR'—COOH and/or —CO—CH=CH—COOH and/or —CO—NR'$_2$ and/or —CO—NHR' and/or —CO—NHSO$_2$R' and/or —CO—R' and/or —CS—R' and/or —CO—OR' and/or —CSNH—R' and/or —CSNR'$_2$ and/or —SO$_2$—OR' and/or —SO$_2$—R' and/or —SO$_2$NR'$_2$ and/or —SO—R, and/or —SONR'$_2$ and/or —PO$_3$H$_2$ or a salt thereof and/or —PO$_2$R'$_2$ and/or —POR'$_2$ and/or —PO(OR')$_2$. r=1 to 20 and R' denotes the same radical as R and/or Y or Y'.

Whereas unmodified cellulose contains 3 hydroxyl groups available for substitution, in the case of chitin there has already been substitution of one hydroxyl group by acetamide groups. This substitution is no longer considered as contributing to the mean degree of substitution within the scope of the present invention provided modified celluloses based on the chitin molecular framework are employed.

If Z is a nitrogen atom, s is preferably equal to O to 0.5 n. If Z is a sulfur atom, s is preferably equal to 0.25 n to n.

Dialysis membranes with the cellulose derivatives according to the invention can be adjusted to the desired degree of substitution by mixing substituted cellulose with unmodified cellulose. The substitution to give the intermediate is carried out by processes known per se and subsequent reaction of this intermediate with acid anhydrides, acid chlorides or isocyanates, for example, in dimethyl acetamide/LiCl solution.

The process described in U.S. Pat. No. 3,702,754 is suitable for the preparation of the intermediate if care is taken that degradation is limited. When crosslinking takes place in this process, some of the products are insoluble which makes them unsuitable.

However, other known processes have proved to be more suitable for the preparation of the intermediate. For example, it is possible in this connection to refer to the Journal of Polymer Science - Part C, No. 11 (1965) pages 107–118 or J. Am. Chem. Soc., Febr. 1950, pages 670–674 and to "Cellulose and Cellulose Derivatives" Part II, edited by Ott, Spurlin and Grafflin, Interscience Publishers, Inc., New York, 2nd edition, 1954, page 822. In these processes, the degree of substitution is adjusted to any desired level.

The complement activation within the scope of the present invention was assessed on the basis of the C3a or C5a fragments. For this purpose, 300 ml of heparinized blood plasma was recirculated in vitro through a dialyzer with an effective exchange area of 1 m$^2$ at a plasma flow rate of 100 ml/min for a period of 4 hours. The C3a fragments in the plasma were determined using the RIA method (Upjohn assay). The relative complement activation for the particular time of measurement was calculated as a percentage by forming the ratio of the concentration at the time of sampling with the initial value. The measurement after a recirculation time of 4 hours was used for the evaluation. Flat membranes were incubated with heparinized blood plasma for 3 hours and then the C3a fragments were determined. The C5a fragments were determined analogously.

The increase in the beta-2-microglobulin level in longterm dialysis patients is observed after use of membranes composed of regenerated cellulose and is attributed to these membranes being less permeable to substances in the molecular weight range 1,000 to 20,000 and the latter thus being removed to an insufficient extent during the dialysis. Beta-2-microglobulin is not adsorbed to a noteworthy extent onto customary membranes composed of regenerated cellulose. However, the cellulose derivatives according to the invention can contribute in an unexpected manner to this.

The beta-2-microglobulin content adsorbed onto the membrane is measured within the scope of the invention in the following manner.

10 ml of human blood plasma are added to each 500 mg of substance (dialysis membrane) and incubated at 27° C. for 30 minutes. The human blood plasma contains 13.67 mg/liter of beta-2-microglobulin. The sample is centrifuged at 3,000 r.p.m. for 15 minutes. The beta-2-microglobulin content in the supernatant is determined. The sample is then washed 2 times with 10 ml of phosphate-buffered saline each time. The microglobulin content in the washings is also determined. The percentage amount of beta-2-microglobulin adsorbed can be calculated from the difference between the original and the unabsorbed beta-2-microglobulin.

The average degree of polymerization (DP) was determined in a cupriethylenediamine solution by the DIN 54270 method.

The degree of etherification and/or degree of esterification were determined on the basis of the analytical results which are known and typical for the substituents, for example nitrogen by the Kjeldahl method, sulfur by the Schoniger method or phosphorus by the molybdate method, where appropriate from the difference between before and after saponification.

Very suitable dialysis membranes are obtained in the case of modified celluloses which are based, as desired, on substituted X and X' molecular residues when X and X' are substituted by the molecular residues Y and Y' respectively.

In general, preferred modified celluloses are those in which the substituents Y and Y' are secondary, tertiary or quaternary amino groups and/or carboxy groups and/or sulfo groups and/or phosphonato groups and/or silicato groups.

Good results in terms of the desired biocompatibility are obtained with dialysis membranes which contain modified cellulose in which, in the indicated structural formula, (X-Y) denotes dialkylaminoalkylene and/or carboxylalkylene and/or carboxylarylalkylene and/or sulfoalkylene and/or sulfoarylalkylene and/or phosphonatoalkylene and/or phosphonatorarylalkylene.

Another embodiment of the invention is obtained when (X-Y) denotes silicatopropylene.

Preferred alkyl radicals for R are methyl groups and/or ethyl groups and/or propyl groups.

It is possible within the scope of the invention and without restriction to carry out the regeneration from dimethyl acetamide/LiCl, for example, whereas the modified celluloses according to the invention are, for example because of their insolubility, unsuitable for regeneration from cuprammonium solutions.

EXAMPLE 1

83.175 g (0.50 mole) of methylaminocellulose (n=0.15) were suspended in 1006.4 g (11.57 mole) of dimethyl acetamide in a 2 liter three-necked flask and activated at 145° C. under nitrogen for 30 minutes. After cooling to 100° C., 95.8 g (2.25 mole) of LiCl were added, during which the temperature rose by 5°-10° C.; the mixture was then rapidly cooled to room temperature (RT always 20°-25° C.) and stirred overnight. 2 g (0.02 mole) of potassium acetate and 14.7 g (0.15 mole) of maleic anhydride were added to the clear viscous solution. To complete the reaction, the reaction mixture was stirred further at 65° C. for 6 hours and at room temperature for 15 hours. The resulting reaction solution was filtered, deaerated and spun to hollow filaments.

i-Propyl myristate was used for lumen filling.

The methylaminocellulose maleate membranes obtained in this way had the following properties:

| | |
|---|---|
| Average degree of substitution (n + s): | 0.28 |
| Wall thickness: | 14 μm |
| Internal diameter: | 200 μm |
| Ultrafiltration rate: | 4.0 ml/h · m$^2$ · mm Hg at 37° C. |
| Vitamin B12 permeability: | 4.8 × 10$^{-3}$ cm/min at 37° C. |
| Beta-2-microglobulin adsorption: | 50% |

The complement activation with the above-mentioned cellulose derivative membrane is less than that with unmodified cellulose membranes. The reduction in C3a compared with the unmodified cellulose membrane is 98%.

EXAMPLE 2

81 g (0.5 mole) of cellulose were suspended in 1006.4 g (11.57 mole) of dimethyl acetamide in a 2 liter three-necked flask and activated at 145° C. under nitrogen for 30 minutes. After cooling to 100° C., 95.8 g (2.25 mole) of LiCl were added, during which the temperature rose by 5°-10° C.; the mixture was then rapidly cooled to room temperature (RT always 20°-25° C.) and stirred overnight. 40.4 g (0.4 mole) of triethylamine were added to the clear viscous solution, and after homogenization, 47.625 g (0.25 mole) of p-toluenesulfonyl chloride were added, and the mixture was stirred at 70° C. for 24 hours to complete the reaction. Analysis of a small amount of sample revealed a degree of esterification of 0.35. 151.5 g (1.50 mole) of hexylamine were added to the reaction mixture. To complete the reaction, the mixture was stirred further at 80° C. for 24 hours. Water was added to the reaction mixture to precipitate the product, which was washed initially with water until free of chloride and then with ethanol, and was dried in a vacuum oven at 65° C. This resulted in 92 g of a product with a nitrogen content of 2.19% corresponding to a degree of substitution DS (n) of 0.30.

In analogy to Example 1, the reaction product was reacted with dodecylsuccinic anhydride in DMAc/LiCl and processed to capillary membranes. The capillary membranes had the following properties:

| | |
|---|---|
| Average degree of substitution (n + s): | 0.38 |
| Wall thickness: | 12 μm |
| Internal diameter: | 200 μm |
| Ultrafiltration rate: | 3.8 ml/h · m$^2$ · mm Hg at 37° C. |
| Vitamin B12 permeability: | 4.1 × 10$^{-3}$ cm/min at 37° C. |
| Beta-2-microglobulin adsorption: | 28% |

The reduction in C3a compared with the unmodified cellulose membrane is 99%.

EXAMPLE 3

A product having a degree of esterification of s=2.2 was obtained by esterification of carboxymethylthiocellulose (n=0.12) with acetic anhydride according to known procedure.

The product was dissolved in a mixture of formic acid, polyethylene glycol and water (82:11:7 parts by weight) and processed to flat membranes.

The reduction in C5a compared with unmodified cellulose is 92%.

EXAMPLES 4–15

In analogy to Examples 1, 2 or 3, the derivatives listed in the table were synthesized and processed to flat membranes, and their complement activation was determined on the basis of the C5a fragments.

TABLE

| Example | Starting polymer | s | Q | Z | T | X-Y | n | C5a red. % |
|---|---|---|---|---|---|---|---|---|
| 4 | Cellulose | 0.30 | COC$_6$H$_4$—COOH | N | =Q | C$_6$H$_{13}$ | 0.25 | 95 |
| 5 | Cellulose | 2.0 | COC$_2$H$_5$ | S | — | CH$_2$—COOH | 0.10 | 98 |
| 6 | Cellulose | 1.5 | COC$_3$H$_7$ | S | — | C$_3$H$_6$—SO$_3$H | 0.13 | 94 |
| 7 | Cellulose | 2.1 | COCH$_3$/COC$_6$H$_4$—COOH | S | — | C$_2$H$_4$OH | 0.05 | 96 |
| 8 | Cellulose | 0.25 | CONHC$_6$H$_5$ | S | — | C$_{12}$H$_{25}$ | 0.07 | 93 |
| 9 | Cellulose | 2.2 | COCH$_3$/COCH$_2$CH(—SO$_3$H)—COOH | S | — | C$_6$H$_5$ | 0.04 | 91 |
| 10 | Cellulose | 2.0 | COCH$_3$/COC$_2$H$_5$ | S | — | CH(—COOH)—CH$_2$COOH | 0.11 | 97 |
| 11 | Cellulose | 2.0 | COCH$_3$ | N | =Q | C$_5$H$_{10}$—COOH | 0.07 | 80 |
| 12 | Cellulose | 0.10 | COC$_{17}$H$_{35}$ | S | — | C$_2$H$_4$—COOH | 0.13 | 95 |
| 13 | Cellulose | 1.6 | COC$_3$H$_7$ | N | =Q | C$_{11}$H$_{22}$—COOH | 0.06 | 90 |
| 14 | Chitin | 1.3 | COCH$_3$ | S | — | CH$_2$—COOH | 0.12 | 98 |
| 15 | Chitin | 1.4 | COC$_2$H$_5$ | S | — | CH$_2$—COOH | 0.11 | 99 |
| 16 | Cellulose | 2.1 | CH$_2$COOH/COCH$_3$ | S | — | CH$_2$—COOH | 0.08 | 99 |

What is claimed is:

1. A modified carbohydrate, wherein the modified carbohydrate has a structure represented by the formula

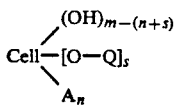

wherein:
Cell is a framework of an unmodified carbohydrate molecule or of a chitin molecule, in each case without hydroxyl groups;
A is selected from the group consisting of

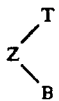

and Z-B;
Z is a nitrogen or sulfur atom;
in the case where Z is a nitrogen atom, A is

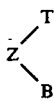

and T and Z together are an acylamide or urea group and Q is at least one member selected from the group consisting of (X'-Y'), together with the O an ester group, and together with the O a carbamate group;
in the case where Z is a sulfur atom, A is Z-B and Q is at least one member selected from the group consisting of (X'-Y'), together with the O an ester group, and together with the O a carbamate group;

$0 < n < m$ and $0 \leq s < m$;

(n+s) is the mean degree of substitution;

m=3 in the case of the unmodified carbohydrate molecule and m=2 in the case of the chitin molecule;

B is selected from the group consisting of Y and X-Y; —X— and —X'— are each at least one member selected from the group consisting of a substituted or unsubstituted, straight or branched chain alkylene, alkenylene or alkynylene radical in which the carbon chain may be interrupted by hetero atoms or by CO—, CONR— or COO— groups, a substituted or unsubstituted cycloalkylene which may contain hetero atoms, a substituted or unsubstituted arylene, arylalkylene, arylalkenylene, or arylalkynylene radical which may contain hetero atoms, a substituted or unsubstituted bisarylalkylene or bisarylene radical, a substituted or unsubstituted radical of a condensed aromatic compound and a substituted or unsubstituted radical of a heterocyclic compound;
—Y and —Y' are each at least one member selected from the group consisting of —H, —NR$_2$, —NR$^+$R$_3$, —COOH or a salt thereof, —COOR, —CONR$_2$, —CO—R, —CS—R, —CSOH or a salt thereof, —CSOR, —CSNR$_2$, —SO$_3$H or a salt thereof, —SO$_3$R, —SO$_2$—R, —SO$_2$NR$_2$, —SR, —SOR, —SONR$_2$, —PO$_3$H$_2$ or a salt thereof, —PO(OR)$_2$, —PO$_2$H(NR$_2$), —PO(NR$_2$)$_2$, —PO$_2$H$_2$, —POH(OR), —CN, —NO$_2$, —OR, halogen and —Si(OR)$_3$; R is at least one member selected from the group consisting of a hydrogen atom, a straight or branched chain alkyl, alkenyl or alkynyl group having 1 to 36 C atoms in which the carbon chain may be interrupted by hetero atoms or by CO—, CONR— or COO— groups, a substituted or unsubstituted cycloalkyl group which may contain hetero atoms, a substituted or unsubstituted aryl, arylalkyl, arylalkenyl or arylalkynyl radical which may contain hetero atoms, a substituted or unsubstituted bisarylalkyl or bisaryl radical, a substituted or unsubstituted radical of a condensed aromatic compound, and a substituted or unsubstituted radical of a heterocyclic compound;
X is identical to or different from X' and Y is identical to or different from Y';
where Q together with the O is at least one member selected from the group consisting of an ester and a carbamate group, Q is at least one member selected from the group consisting of

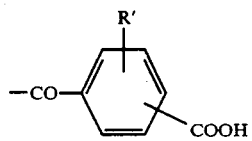

—CO—(CH$_2$)$_r$—COOH, —CO—(C$_2$H$_3$)—COOH,
|
(CH$_2$)$_r$—H

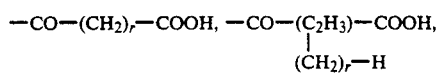

—CO—(C$_2$R'$_4$)—COOH, —CO—CR'=CR'—COOH, —CO—CH=CH—COOH, —CO—NR'$_2$, —CO—NHR', —CO—NHSO$_2$R', —CO—R', —CS—R', —CO—OR', —CSNH—R', —CSNR'$_2$, —SO$_2$—OR', SO$_2$—R', —SO$_2$NR'$_2$, —SO—R', —SONR'$_2$, —PO$_3$H$_2$ or a salt thereof, —PO$_2$R'$_2$, —POR'$_2$, and —PO(OR')$_2$;
r=1 to 20;
R' is at least one member selected from the group consisting of the same radical as R, Y, and Y'.

2. A modified carbohydrate as claimed in claim 1, wherein Z is a nitrogen atom and s=0 to 0.5 n.

3. A modified carbohydrate as claimed in claim 1, wherein Z is a sulfur atom and s=0.25 n to n.

4. A modified carbohydrate as claimed in claim 1, wherein X or X' substituted with the molecular radicals Y or Y'.

5. A modified carbohydrate as claimed in claim 1, wherein the modified carbohydrate contains at least one member selected from the group consisting of secondary, tertiary and quaternary amino groups, carboxy groups, sulfo groups, phosphonato groups and silicato groups.

6. A modified carbohydrate as claimed in claim 5, wherein X-Y is at least one member selected from the group consisting of dialkylaminoalkylene, carboxyalkylene, carboxyarylalkylene, sulfoalkylene, sulfoarylalkylene, phosphonatoalkylene and phosphonatoarylalkylene.

7. A modified carbohydrate as claimed in claim 1, wherein X-Y is silicatopropylene.

8. A modified carbohydrate as claimed in claim 1, wherein said alkyl group is at least one member selected from the group consisting of methyl, ethyl and propyl.

9. A modified carbohydrate as claimed in claim 1, wherein said hetero atoms are at least one member selected from the group consisting of O, S, N, P and Si.

10. A modified carbohydrate as claimed in claim 1, wherein said unmodified carbohydrate comprises unmodified cellulose.

* * * * *

UNITED STATES PATENT AND TRADEMARK OFFICE
CERTIFICATE OF CORRECTION

PATENT NO. : 5,026,834
DATED : June 25, 1991
INVENTOR(S) : Michael DIAMANTOGLOU et al It is certified that error appears in the above-identified patent and that said Letters Patent is hereby corrected as shown below:

Col. 1, line 67, change "$-N+R"_2-$" to -- $-N^+R"_2-$ --.

Col. 2, line 1, change "$-O-$" to -- $-O-$ --;

line 26, change "$-N+R_3$" to -- $-N^+R_3$--.

Col. 4, line 23, change "$0<s<m$" to --$0\leq s<m$--;

line 44, change "$-N+R_3$" to -- $-N^+R_3$--.

Col. 5, line 33, after "invention" insert --,--;

line 36, change "0" to --O--.

Col. 6, line 11, change "longterm" to --long-term--.

IN THE CLAIMS:

Claim 1, col. 9, line 35, change "$0<n<m$" to --$0<n<m$--.

Signed and Sealed this

Second Day of March, 1993

*Attest:*

STEPHEN G. KUNIN

*Attesting Officer*    *Acting Commissioner of Patents and Trademarks*